United States Patent [19]

Kuehnle

[11] Patent Number: 5,029,156
[45] Date of Patent: Jul. 2, 1991

[54] METHOD AND MEANS FOR READING ELECTRONIC SIGNAL PATTERNS STORED ON A MOVABLE IMAGE RECORDING SURFACE

[76] Inventor: Manfred R. Kuehnle, Waldesruh, Rte. 103A, New London, N.H. 03257

[21] Appl. No.: 472,361

[22] Filed: Jan. 30, 1990

Related U.S. Application Data

[63] Continuation of Ser. No. 48,584, May 11, 1987, Pat. No. 4,897,731.

[51] Int. Cl.$^5$ .............................................. G11B 11/08
[52] U.S. Cl. .................... 369/126; 369/101; 369/97; 365/118; 346/158; 346/153.1
[58] Field of Search ................................. 358/217, 335; 365/153.1, 118, 217, 237, 114, 112; 346/158, 161; 250/472.1; 355/3 R, 3 TE; 369/97, 101, 126

[56] References Cited

U.S. PATENT DOCUMENTS

4,059,827 11/1977 Byatt .............................. 369/126 X

Primary Examiner—Robert L. Richardson
Attorney, Agent, or Firm—Cesari and McKenna

[57] ABSTRACT

A scanning system for optoelectronically recorded signal patterns stored in a plural layer medium consisting of inorganic materials throughout and featuring a dielectric storage layer at the surface which faces an electron beam source. The source beam first searches for a position mark associated with an image frame on the medium in order to establish a precise home position of the beam and associated coordinate axes prior to commencing the scan operation on that medium frame. Then the beam scans a raster on the medium spending a certain dwell time at each resolution element of the raster. Each time a frame is reached, the system is capable of altering the beam current in response to a prerecorded exposure code in order to achieve the optimal retrieval of all information stored image-wise within said frame. The system then collects electrons emitted from the medium due to the scanning beam in a collector, which incorporates a highly sensitive amplifier, for further processing, with the medium being movable frame by frame as desired.

5 Claims, 4 Drawing Sheets

METHOD AND MEANS FOR READING ELECTRONIC SIGNAL PATTERNS STORED ON A MOVABLE IMAGE RECORDING SURFACE

RELATED APPLICATION

This application is a continuation of Ser. No. 048,584, filed May 11, 1987, now U.S. Pat. No. 4,897,731.

This invention relates to method and apparatus for reading an image recorded electronically on a recording surface. It relates more particularly to a read-out system for producing signals representative of electronic patterns stored on a movable electronic storage medium.

BACKGROUND OF THE INVENTION

There presently exist electronic devices such as vidicons which use an electron beam to detect the presence of optical or electronic signal patterns on a recording surface. Depending upon the particular application, these devices use different means for focusing and deflecting the electron beam, as well as for collecting the signal currents representative of the electronic pattern recorded on the recording surface All of these devices have three things in common, namely (1) a cathode which emits the electron beam, (2) a recording surface which is able to sense an optically induced electronic resistance pattern, and (3) collector means for collecting a signal current resulting from the scanning of the optically induced pattern by the beam.

In a typical vidicon, the recording surface is a transparent metallic plate on the face of the vidicon tube, one side of which is coated with a thin layer of photoconductor material. The optical image is focused onto the photoconductor material layer and is scanned with an electron beam originating at a cathode spaced from the tube face while the optical image persists. The scanning beam deposits electrons on each scan spot so as to generate a current to ground whose magnitude corresponds to the change in resistance of the photoconductor which, in turn, is proportional to the intensity of illumination on said spot The current through a load resistor connected to the plate, which constitutes the output of the vidicon, therefore, reproduces the variations in the light intensity of the successive portions of the optical image projected onto the face of the vidicon.

Prior apparatus such as this for reading an image from an electronic recording surface without making it visible via electrotatic toner, but using a scanning electron beam instead, are disadvantaged because the positions of the electron beam source and the recording surface position are fixed. Accordingly, only one image at a time can be stored on the recording surface. In other words, in order to read an image from that surface, all previous images recorded thereon will have had to be stored elsewhere so that the recording surface can be erased. Therefore, electron devices such as vidicons have limited application as means for reading electronically stored images.

There have been some efforts in the past to develop a recording medium or phototape which can store a plurality of electronic images for later readout directly using a scanning electron beam. Such a system is disclosed in the publication *Electrostatic Imaging and Recording* by E. C. Hutter, et al, Journal of the S.M.P.T.E. Vol. 69, January 1960, pp. 32-35. The recording medium or phototape in that reference is also disclosed in U.S. Pat. No. 3,124,456 (Moore). The medium comprises a transparent polyester base coated on one side with a layer of photoconductive material which is, in turn, coated with a thin layer of a dieletric material. To record an image on that medium, the dielectric layer is precharged by a voltage applied across that layer and then the photoconductive layer is exposed to a light image while an electric field is applied across the dielectric layer. The charge in the dielectric layer decays towards zero with the decay being most rapid where the optical image is brightest and, therefore, the photoconducitve resistance is lowest. After a time corresponding to the greatest difference between the potentials in the light and dark areas of the medium, the electric field is turned off and the discharging process stops, thereby leaving on the dielectric layer an electrostatic charge distribution corresponding to the optical image incident on the medium. The stored image may be read from the medium by scanning the dielectric layer with a focused electron beam to produce an electrical signal corresponding to the stored image.

The Hutter et al system has several disadvantages. It can store acquired data in the recording medium for only a limited period of time, e.g. a few weeks, because of charge leakage in the dielectric layer of that medium Also, the medium has poor light sensitivity. Accordingly, the quality of the images recorded on the medium is not very high. Most importantly, readout of the image stored on the medium by the scanning electron beam is accomplished by detecting a capacitively modulated current signal from the medium involving simultaneous movement of many charge carriers in the medium. Resultantly, the resolution of the detected picture signal is much less than that of the stored electronic image which, as just stated, was fairly poor to begin with.

The Hutter et al system is disadvantaged also because in the process of reading the stored images on the recording medium using a scanning electron beam, those images are rapidly degraded by the electron beam scanning process itself because the beam electrons cause electronic conduction in the medium. In other words, when that system performs a read operation, it also tends to erase the images stored in the medium. This, of course, is completely unacceptable if that arrangement is to be considered for storage of images which may have to be retrieved several times during the storage period. Also, during the image sensing operation, the photoconductive medium proposed by Hutter is plagued by excessive dark currents which reduces the signal detection threshold sharply.

Other systems which use a scanning electron beam to read images on a movable storage medium are disclosed in U.S. Pat. Nos. 3,880,514 (Kuehnle) and 4,242,433 (Kuehnle et al). Those systems are superior to the Hutter et al recording system in that they do not require precharging of the recording medium; otherwise they are disadvantaged in the same respects. Indeed, all these prior systems are totally useless for long term storage of high resolution image patterns and for sensing signals at very low light levels.

SUMMARY OF THE INVENTION

Accordingly, this invention aims to provide an improved read-out system for producing signals representative of electronic signal patterns stored on a movable electronic storage medium.

Another objective of the present invention to provide an electron beam scanning system having a recording surface that is movable so that a plurality of images can be stored simultaneously on the recording medium and be scanned selectively by the beam.

Another object of the invention is to provide a system of this type whose movable recording medium has a plurality of imaging frames which can be positioned accurately for scanning by the electron beam.

A further object of the invention is to provide an electron beam scanning system whose beam has an auto-positioning capability to achieve precise alignment of the beam position and scan direction prior to commencing the scan, with respect to the electronic pattern stored on each frame of the recording medium.

Yet another object of the invention is to provide such a system whose image-representing output, produced during the electron beam scanning process, has an unusually high signal-to-noise ratio.

A further object of the invention is to provide an electron beam scanning system which can read image-representative electronic patterns on a recording medium using a scanning electron beam in a manner that does not degrade the stored patterns.

Yet another object of the invention is to provide a system of the aforesaid type which achieves close control of the electron beam scan path during the reading of an electronic pattern stored on a recording medium.

Another object of the invention is to provide an electron beam scanning system for reading images recorded electronically on a recording medium that can operate with minimal electrical power as compared with other image sensing, storing and scanning devices.

A further object of the invention is to provide an electron beam scanning system having a movable recording member which can form the basis of a microscope, a camera or even a digital signal storage memory unit.

Another important object of the invention is to provide a reading process, which scans the storage medium with one or more sensing needles capable of detecting tunneling electrons when a voltage is applied between the medium and each needle, with the number of electrons being modulated by the imagewise field pattern on the medium at that location.

Still another object of the invention is to provide methods of retrieving or reading electronic images stored on a movable recording medium that produce one or more of the aforesaid advantages.

Other objects will, in part, be obvious and will, in part, appear hereinafter.

The invention accordingly comprises the several steps of the relation of one or more of such steps with respect to each of the others, and the apparatus embodying the sequence of steps and the features of construction, combination of elements and arrangement of parts which are adapted to effect such steps, all as exemplified in the following detailed description, and the scope of the invention will be indicated in the claims.

Briefly, my electron beam scanning system includes an electron beam source or an array of current detecting needles, an optoelectronic recording member having a plurality of image frames for storing electronic patterns and a collection means for electron emissions which represent the information signals. The recording member can be moved relative to that source to position the image frames selectively for scanning by the electron beam in order to read the images stored on those frames. Preferably, the recording member incorporates the plurallayer, solid state, wholly inorganic, wholly crystalline, optoelectronic recording medium disclosed in my co-pending application Ser. No. 872,899, filed June 11, 1986, now U.S. Pat. No. 4,862,414 which disclosure is incorporated by reference herein. That medium includes a transparent inorganic base, a photoconductive modulator on the base and a dual-material dielectric storage layer on the modulator. It can be controllably and simultaneously electronically charged and exposed so that the medium acquires and stores in its storage layer an electronic charge pattern corresponding to the image projected onto the medium. Preferably also, the recording member is in the form of a tape, although it could just as well be a disc, drum or plate, having sufficient surface area to accomodate at least a plurality of, and preferably many, separate recording areas or frames, each capable of acquiring and storing an image-representing electronic pattern. The storage member is movably positioned within an evacuated housing so that it can be shifted to position any selected frame at a write station or at a read station also located within the evacuated housing.

At the write station, a selected frame on the tape is positioned at a focal plane and exposed to an optical image or signal projected onto that frame by projection optics mounted in the wall of the housing. While the tape frame is being exposed to the incoming optical signal, an electron source at the write station deposits a cloud of electrons on the surface of the tape's dielectric storage layer thus creating a virtual, momentary electrode. At the same time, the active layers of the tape are subjected to a very intense electric field caused by the electron deposition on the surface of the dielectric storage layer and a counter-potential at an electrode layer beneath a light modulating photoconductive layer comprising the modulator, that electrode layer being placed directly on the base or support substrate of the tape. The energy in the light image focused onto the tape frame is absorbed in the photoconductive layer or zone, thereby creating electron-hole pairs in that photoconductor. Under the influence of the field, which is established between the two electrodes, the positive carriers or holes created by the light will tunnel through an interface or barrier zone (field effect) comprising one component of the dual-material storage layer and penetrate the underside of the other storage layer component, namely the dielectric storage zone forming at that location so called charge centroids, while the negative charges or electrons are conducted away from the photoconductive zone via the electrode to an external battery. The positive charges become trapped or "pinned" to the underside of the dielectric storage zone and as soon as the electric field is turned off, the interface zone acts as a barrier to prevent any thermally-generated or image-unrelated photogenerated charges from tunneling through the interface zone and thus accidently neutralizing the positive, image-related charges which are pinned, as charge centroids, at the underside of the dielectric storage zone. To keep positive charges from emanating at the electrode and being injected into the photoconductor, the electrode is typically made of an n-type structure.

While the image projected onto the tape frame at the write station may be a black and white image, preferably it is a color image produced by passing the imaging light through an array of alternating, thin, horizontal red, green and blue filter stripes (or a diffraction filter) present on a platen in the focal plane or on the tape itself as will be described in more detail later. Thus the charge pattern applied to the tape frame consists of interlaced red, green and blue color components of the image projected onto the frame. In other words, the picture information for each color component of the picture is stored every third line on the tape frame.

Simultaneous with the recording of the picture on the tape frame, a precise electronic fiducial mark is recorded in that frame outside the image area of the tape. This fiducial mark enables the system, prior to each read-out operation, to set the initial or "home" position and skew of the scanning electron beam from the electron beam source or needle array sensor to compensate for any slight mispositioning of the tape frame at its position in the read station when the electronic image thereon is being read from the frame by the scanning electron beam with respect to its position at the focal plane in the write station when that image was recorded on that frame.

My system may also include provision for automatically focusing the image projected onto the frame at the write station and for setting automatically the charging current applied to the tape's electrode layer in accordance with the intensity of the incoming light in order to control automatically the frame exposure. In fact, the tape and the remaining elements of my system interact and cooperate optically and electronically to optimize the exposure of the tape under the prevailing light conditions at the write station so that the image recorded on the tape frame is at the highest resolution and has many steps of gray (dynamic range) and large contrasts. The electronic pattern recorded on the tape frame corresponds to an optical image that is finely focused and the image-representing charges stored at different locations on the tape frame may vary from as few as 20 electrons/resolution element to 20,000 electrons/resolution element. This charge difference, yields a dynamic range in the stored image of 1,000:1, thereby permitting easily the retrieval of 32 or more different gray levels in the image recorded on the tape frame.

In the present system, the tape is moved between the write and read stations by a pair of motor-driven spools, with the tape being guided along a focal plane at the write station and along a scanning plane at the read station. The motors are controlled by the system controller in response to signals from a pair of frame position detectors at the write and read stations which sense position marks denoting the location of each image frame on the tape. By counting position signals from these detectors, the system controller "knows" when any selected frame is located at the write station and when that frame is positioned at the read station, and it also is able to maintain a count of the frame number.

When it is desired to retrieve an image previously recorded on a particular image frame of the tape at the write station, the controller activates the tape drive motors to position that selected frame in the scanning plane of the read station. After the position detector there detects the position mark corresponding to that frame, it issues a control signal to the system controller which thereupon stops the tape drive motors so that the frame is centered in the scanning plane as accurately as possible within allowable mechanical tolerances.

An electron beam source at the read station then directs a beam of electrons to the dielectric layer of the tape frame present at the scanning plane to seek an electronic position/fiducial mark so that the beam can lock the sweep control electronics into a "zero-setting" scan position thereby initializing the read operation. Then, the electron source is controlled so that the electron beam sweeps out a parallel raster on the dielectric surface of that frame. If the electronic pattern on the frame represents a color image, the raster lines should correspond to lines on the frame that were exposed through the array of parallel, horizontal filter stripes at the write station. Preferably also, the beam source cathode consists of a cold field emission source rather than a thermoionic source because the former requires less power and does not generate infrared emission so that the tape frame present at the read station is not exposed to perceptible light radiation. Such radiation would degrade the electronic image stored on the tape during read-out because the tape is sensitive to infrared radiation.

During read-out, the information contained on the tape frame at the read station is not retrieved by detecting a capacitively modulated current signal from the tape in the manner of conventional electronic beam scanning apparatus described at the outset. Rather, during read-out, the scanning electron beam in the present system, while finely focused, is capable of penetrating the tape's insulating storage layer with sufficient energy to generate the secondary emission of electrons from beneath the surface of the insulator. The electronic image or signal pattern is represented by field domains across the insulator thickness whereby the positive charges sit well beneath the penetration depth of the electron beam and, therefore, remain unaffected by the scan beam. Accordingly, the scanning of the tape by the beam does not erase the stored signal pattern or image. Repeated scanning of the medium by the primary beam does cause unimaged areas of the medium surface to become progressively more positive. This unbalance may be removed and the surface replenished with negative charges by exposing the medium surface to a beam of relatively low energy electrons either before or after the medium is scanned for readout of image data.

The number of electrons in the secondary flux from each resolution element scanned is measured and compared to the number of primary electrons, with the difference in flux being the indicator and measure of the signal after deducting the flux due to the coefficient of emission from the neutral medium surface. Accordingly, the electrons in the secondary flux from the tape have a numerical distribution by pixel or area element (resolution element) that represents the total electronic image stored on that frame. These emitted secondary electrons are collected by an electron collector located at the read station which is capable of literally counting the return flux electrons and then amplifying them appropriately with a minimum of electrical noise so that the system produces an output signal which is the electrical analog of the electronic pattern stored on that tape frame. The comparison of the number of primary electrons to the larger number of secondary electrons results in a fixed numerical value; any lesser electron count in the collector than the value indicated above represents the image signal. In other words, an intense field in the scan area may sharply limit the number of emitted secondary electrons thus indicating the presence of a previous intense light exposure Typically, during the reading of an electronic image from the tape, the beam potential is fixed near the second crossover potential so that the number of secondary electrons exceeds the number of primary beam electrons due to the coefficient of secondary emission which is larger than 1.0. The image is usually recorded on the tape in the presence of an electrical bias field caused by the deposition of a uniform blanket of electrons on the tape surface, which blanket charge may still be present on the tape surface when the tape is positioned for read-out In my system, the scanning beam operated at the proper energy level automatically removes the uniform blanket bias charge from the electronic image on the tape, leaving behind only the image-representing pattern of positive charges stored deep within the tape's dielectric storage zone, along with the corresponding equivalent electron pattern present on the tape surface, these negative surface charges being replenished as described above so that the pattern of surface charges mirrors the pattern of positive charges "pinned" within the medium.

It is important to appreciate that this system, unlike vidicon devices, operates the scanning electron beam independently of and asynchronously from the signal recording event at the write station, both in terms of time and duration. Accordingly, considerably more time can be spent reading an image from a tape frame than was spent recording the image on that frame during the exposure step Due to this extended time period available for image retrieval, the signal-to-noise ratio of my system can become markedly better than those of vidicon devices in which an image is recorded on and read from the recording members of those devices at the same time and synchronously with the exposure duration. Furthermore, it permits the use of a collector in the form of a channeltron or dynode-type electron multiplier which itself has a superior unsurpassed signal-to-noise ratio.

Actually, as will be described in more detail later, the total amount of time used for scanning the tape frame during a read operation is chosen to permit sufficient dwell time of the beam at each resolution element of the electronic image on the tape frame to permit an incremental increase in primary electron beam current during that dwell time in order to cover a very wide range of signal charges on that resolution element. In other words, the beam current of the electron beam is varied at each resolution element or point in the scan time so as to permit the detection of a large range of signal electrons from a minimum of 20 to a maximum of 20,000 or even more. Actually, the exposure value for each frame can be recorded on the frame (along with the fiducial mark) at the same time the picture is taken. Then during readout, this value can be read by the scanning means and used to select the optimum primary beam current for scanning that particular frame to maximize the information content of the retrieved image. These provisions for varying the beam current ensure that the image storage and retrieval capabilities of the system will have a wide dynamic range of 1,000:1 or more. It must be emphasized that no other recording medium capable of sensing light, such as photographic film, can cover a dynamic range of 1000:1. Usually 100:1 is the limit. In the case of a color picture, the collector generates a set of three analog signals representing the red, green and blue color information stored electronically on the tape frame. These signals, which are in serial form, are then amplified, digitized, color corrected and otherwise processed in ways known in the color graphics art to produce picture signals for controlling a color display or color printer. The sensitivity of the electron collector-amplifier, combined with the nearly noise-free perfection of the optoelectronic recording tape, gives my system extremely high sensitivity and fast response, equivalent to a silver halide color film speed in the order of ASA 3,000.

During aforementioned initializing routine at the outset of each read-out operation by my system, the system controller causes the electron beam control circuit to align the beam scan with the electronic pattern previously recorded on that frame at the write station. In accordance with this routine, the electron beam source is activated and the beam is deflected in order to determine the location and skew of the electronic position/fiducial mark that was recorded on that frame alongside and simultaneously with the electronic image that was recorded on that frame. More particularly, the beam is swept over a frame margin containing the fiducial mark. When the beam impinges on the mark, a positive or negative "burst" of secondary electrons will be emitted resulting in a corresponding output signal from the collector. By properly controlling the beam sweep in relation to the shape of the fiducial mark in a manner to be described later, the resultant output signal may be used to establish an initial or "home" position for the beam control circuit so that the track of the beam will follow exactly the image information lines which were exposed onto the frame at the write station and be guided precisely along those lines during the scanning process. In this way, a slight mispositioning or skewing of the tape in its movement from the write station to the read station will not effect the read-out process.

The ability of my system to initialize or set the home position of the beam deflection electronics using fiducial marks recorded on the tape frames simultaneously with the optical images thereon is particularly important when the signal pattern on that frame corresponds to a color picture. This is because the frame area is imaged through the parallel array of very narrow alternating red, green and blue filter stripes or an equivalent diffraction reticle. In practice, the beam diameter, 2.0 micrometers, is only slightly narrower than the width of these filter stripes, e.g. 2.5 micrometers, so that even minute mispositioning or skewing of the tape in its movement from the write station to the read station will misposition the color line information recorded on the tape frame at a shifted position with respect to the electron beam source. This may cause the scanning electron beam to straddle two filter lines as it sweeps out the raster on the tape resulting in an output signal that will represent a mixture of two colors rather than a single color as desired. In the present system, the simultaneous recording of the fiducial mark and signal pattern on the frame area, while that area is geometrically fixed at the write station where recording took place and prior to any movement of the tape relative to the array of filter stripes positively links those filter stripes to the scan coordinates and deflection electronics which guide the electron beam in its sweep of that frame when the image is being retrieved.

Each frame of the tape used in my system can be scanned numerous times without destruction or even material degradation of the information recorded electronically thereon. In fact, the electronic pattern stored on each frame is refreshed with the aid of the electron source at the write station to restore the original distributed charge potentials and thus the contrast of that stored image. If, however, it is desired to record other optical images onto particular frames, the electronic images already stored on those frames can be erased quite easily by exposing those tape frames briefly to ultraviolet light. The short wavelength energy renders the dielectric storage layer of the tape sufficiently conductive to neutralize the electronic charges stored at opposite surfaces of that layer.

Thus my electron beam scanning system which includes a movable, rather than a fixed, recording member is able to record and store a plurality of different images on the same member and to retrieve those images for display or reproduction when the need arises. The image recorded as a charge pattern in each member frame exists independently and can be erased or refreshed to enhance image contrast without effecting images recorded in adjacent frames. Also, the nearly noise-free perfection of the recording member in my system, coupled with the extremely high sensitivity of the system's read-out section which retrieves images from the member by detecting secondary electrons emitted therefrom, gives the overall system extremely high sensitivity, fast response and a very wide dynamic range. Therefore, this system should find wide application wherever the "tunnel electrons" long-term storage and subsequent retrieval of visual information or an electromagnetic signal pattern is desired.

As alluded to previously, instead of retrieving the image stored on the tape frame by electron beam scanning, the tape can also be read by detecting so-called "tunnel electrons" using a scanning sensor in the form of one or more current detecting sensing needles that is caused to move across the surface of the tape at a very short distance therefrom. As each needle sweeps across that surface, electron clouds are present in the gap between the surface and the needle tip as a consequence of the stored electrons' wave-like properties. A voltage-induced flow of electrons through the clouds is created which varies from point to point on the tape, depending on field strength which indicates the charge stored thereat. As will be described later in detail, using this technique, electrons can be "picked off" the tape surface at each point on the frame to produce picture signals corresponding to the image recorded on the tape.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
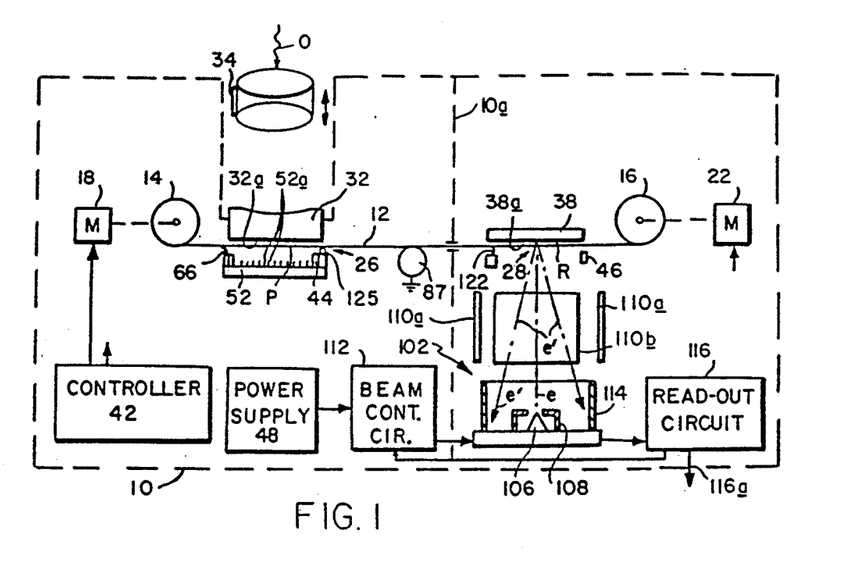
FIG. 1 is a diagrammatic view of an electron beam scanning system with movable recording member made in accordance with this invention.

Referring to FIG. 1, the components of my system are mounted inside a hermetically sealed housing 10 which is maintained under a high vacuum in the order of $10^{-8}$ Torr. Suitably positioned inside the housing is a recording member in the form of a long optoelectronic tape 12 that is stretched between a pair of spools 14 and 16, rotatively mounted in housing 10. These spools are rotated in either direction by a pair of drive motors 18 and 22, respectively, so that selected frame areas or frames 12a (FIG. 2) along the tape can be positioned at a write station, shown generally at 26, where electronic images can be written or recorded on the tape, or at a read station, shown generally at 28, separated from station 26 by a vertical partition 10a, where electronic images already recorded on the frames can be read or retrieved from the tape to produce corresponding picture signals suitable for controlling an electronic display or printer so that the stored images can be viewed or reproduced.

In the system 10 specifically illustrated in FIG. 1, the optical images are recorded on the tape frames 12a Accordingly, the system includes a transparent platen 32 mounted in a gas-tight manner in the housing 10 wall. The platen has an inner surface 32a which positions a of tape 12 at a focal plane P which constitutes the exposure position of the tape. A projector, shown generally at 34, is adjustably mounted to the housing directly opposite platen 32 so that an optical image 0 in a field of view can be brought to focus at the focal plane P, i.e. at the tape frame 12a in the read station 26. The platen constitute an optical element in the optical path to flatten the field over the focal plane, to divide the incoming light into its primary color components, etc. and, when a voltage is applied, to attract and hold the tape flat against the platen 32 surface.

Preferably, the platen is of the type disclosed in my above-identified application which has light-sensing capabilities that can be used to focus projector 34 automatically prior to each exposure and to set the exposure duration when an image is being recorded on the tape at station 26. By applying currents to motors 18 and 22 of the appropriate magnitudes and polarities, tape 12 may be kept taut and moved in either direction to position a selected frame 12a opposite platen 32 at focal plane P. The mechanism for transporting tape 12 may include other components such as tape edge guides and a tape gate for accurately locating each increment or frame of the tape at an exposure position at platen 32 in focal plane P.

Another platen 38 at read station 28 has a flat surface 38a adjacent to the stretch of tape from spool 16 that defines a scanning plane R. When the electronic image on a particular frame is to be retrieved from the tape, the spools 14 and 16 are rotated, via their motors 18 and 22, to position that frame at plane R so that the frame can be processed in a manner to be described later.

Figure 2:
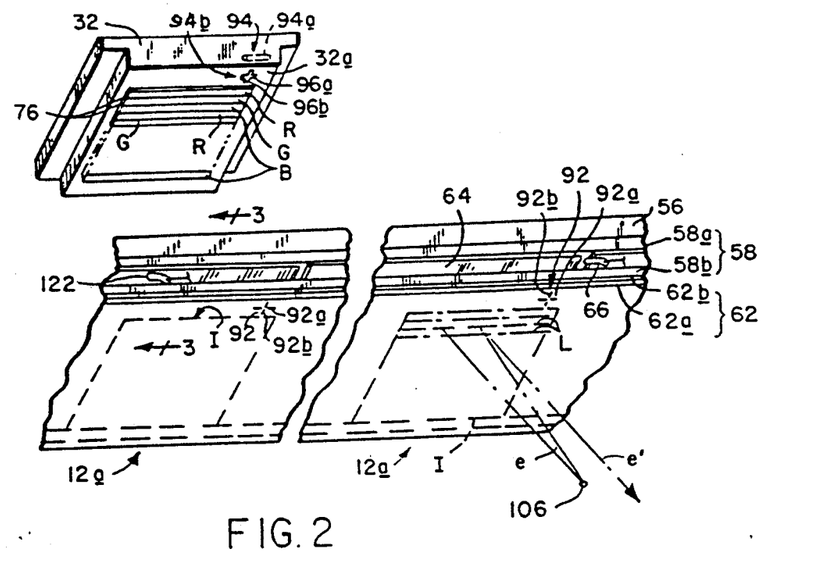
FIG. 2 is a fragmentary exploded isometric view, on a much larger scale, showing certain components of FIG. 1 system in greater detail.

The servo motors 18 and 22 that rotate spools 14 and 16 receive drive signals from a controller 42 in housing 10. The controller controls motors 18 and 22 to position a selected tape frame 12a at either focal plane P or scanning plane R by counting tape position signals from a pair of optical detectors 44 and 46 mounted opposite platen surfaces 32a and 38a, respectively. These detectors respond to tape frame position marks 92 printed on an edge margin of tape 12 as shown in FIG. 2. Detector 44 emits a signal to controller 42 when a tape frame is positioned properly for imaging at focal plane P. A similar signal to the controller from detector 46 indicates that a frame is properly positioned for readout at scanning plane R. The electrical power for motors 18 and 22 and controller 42 and the other electromechanical parts of the system derives from an appropriate power supply 48 mounted inside housing 10.

Still referring to FIG. 1, also located at write station 26 is a field emission device or electron source 52 which is positioned opposite platen 32 so that it overlies the tape frame present at focal plane P. During the exposure process when an image is being written on the tape, source 52 is activated by controller 42 so that it directs a cloud of electrons from its discharge points 52a against the undersurface of the tape frame present at focal plane P. As we shall see, the undersurface of the tape frame at plane P becomes charged with these negative carriers, enabling that frame to acquire and store an electronic image corresponding to the optical image projected onto that frame by projector 34. The amount of the charge is controlled in terms of time and magnitude to assure the capture of the maximum amount of information contained in the image to be recorded. The electron source 52 may also be used to eliminate an electric bias field (if one is present) from each tape frame after exposure of that frame by removing excess charge carriers from the frame.

Figure 3:
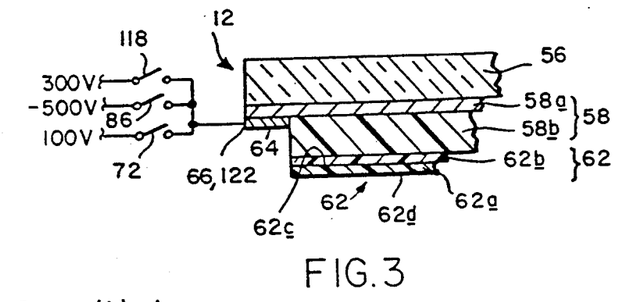
FIG. 3 is a sectional view taken along line 3—3 of FIG. 2.

Referring now to FIGS. 2 and 3 which show the optoelectronic tape 12 in greater detail. Preferably the tape is of the type disclosed in detail in my above application which disclosure is incorporated by reference herein. Therefore, the tape description here will be somewhat abbreviated. The tape includes a flexible, optically clear, ribbon-like monocrystalline sapphire ($Al_2O_3$) base or substrate 56. Added to that base are a thin modulator 58 composed of a photoconductive material such as silicon (Si) or gallium arsenide (GaAs) and a very thin, i.e. 1000 Angstroms, dual-material storage layer 62. A very thin boron or phosphorous-doped zone 58a of modulator 58 (i.e. n-doped with fixed positive charges) is present adjacent to base 56 to serve as an electrode. The remaining zone 58b of modulator 58 is free of additives.

The dual-material storage layer 62 is composed of a very thin (about 1000 Angstoms) storage zone or layer 62a composed of a suitable dielectric material such as silicon nitride ($Si_3N_4$) and an ultra-thin (i.e. about 30 Angstroms) interfacial zone 62b of an anisotropically acting dielectric material such as silicon dioxide ($SiO_2$) at the underside of zone 62a. Zone 62b exhibits electrical insulating behavior that prevents penetration of thermally generated or even photogenerated charge carriers in modulator 58 to the undersurface of storage zone 62a; zone 62b does allow tunneling through to the storage zone 62a of photogenerated charge carriers under the influence of a suitable superimposed strong orthogonal electric field through the tape zones 58a and 58b, 62b and 62a. In other words, charge carriers from modulator 58 that have tunneled through zone 62b the influence of an applied field are "pinned" to the underside 62c of storage zone 62a in so-called charge centroids. In the absence of that field, zone 62b prevents additional charge carriers from reaching the storage zone and disturbing the properly accumulated charge count there. Thus, zone 62b traps in storage zone 62a all photogenerated positive charge carriers created during the exposure step, thereby storing electronic signal patterns spatially in that zone of the tape and preventing also any lateral movements of said charge carriers in zone 62a so that an image having exceptional resolution can be maintained on tape 12.

Tape 12 may be made, for example, by the process described in my copending application Ser. No. 872,893, filed June 11, 1986, which disclosure is incorporated by reference herein. The tape has extremely high sensitivity or photospeed and has the capacity to acquire a very high-quality electronic image corresponding to the optical image projected onto it at write station 26 by projector 34. Because of the barrier and trapping functions of the tape's unique dual-material storage layer 62, an image can be stored on the tape for several years without any appreciable degradation of that image.

During a write operation, the frame area positioned at focal plane P is imaged by projector 34 and simultaneously charged by electron source 52. Proper exposure of the tape requires that voltages from power supply 48 be applied to the tape's conductive zone 58a. Accordingly, in the tape edge margin, the material zones 62a, 62b, and 58b are etched away so that a conductive strip 64 can be laid down on conductive zone 58a. Preferably, the strip 64 adjacent to each frame 12a may be isolated electrically from the similar strips associated with the other frames of tape 12 so that electrical connections may be made to each frame independently, As shown in FIGS. 2 and 3, when a particular frame 12a is present at focal plane P, a wiper contact 66 mounted to source 52 contacts strip 64. As shown in FIG. 3, contact 66 is connected to a switch 72 in the system's controller 42. Alternatively, electrical connections to the strip may be made through spool 14 or 16.

Referring to FIG. 2, to enable my system to record color images, the light from projector 34 is passed through an array of numerous, thin, parallel, transparent, abutting, band width-limited, electrical insulating color filter stripes 76 applied to the platen surface 32a that supports tape 12 at focal plane P. In some applications, the filter stripes may be on the front face of the tape itself. It is generally desirable to make filter stripes 76 wavy instead of straight, as shown. This avoids periodicity problems that could occur if the object being focused upon by projector 34 is composed of alternate light and dark bands extending parallel to straight stripes 76 (e.g. a picket fence). Although the drawing figures illustrate stripes 76 as being relatively wide and few in number, in actuality, there may be several thousand stripes in the array on platen 32, each stripe being in the order of only a few (e.g. 2.5) microns wide. The filter stripes 76 on platen 32, while they may be a diffraction filter, actually consist of very fine abutting parallel red (R) green (G) and blue (B) films which divide the incoming light image into its color components. Thus, when a tape frame 12a is exposed at plane P, the image applied to the image area I of the frame consists of red, green, and blue color components of the picture projected onto the frame, which components are interlaced on the frame. In other words, the picture information for each color component of the picture is stored every third line of the tape frame at plane P. As will be seen, the color filter stripes coincide with the raster path of an electron beam that scans the frame in order to read out the image thereon when the frame is located at read station 28.

The system may also include provision for automatically focussing projector 34 prior to writing an image on the tape and for controlling the charging of the tape by electron source 52 during the exposure process. Since those provisions are described in my first-mentioned application, they will not be detailed here since they are not really part of the present invention.

Figure 4:
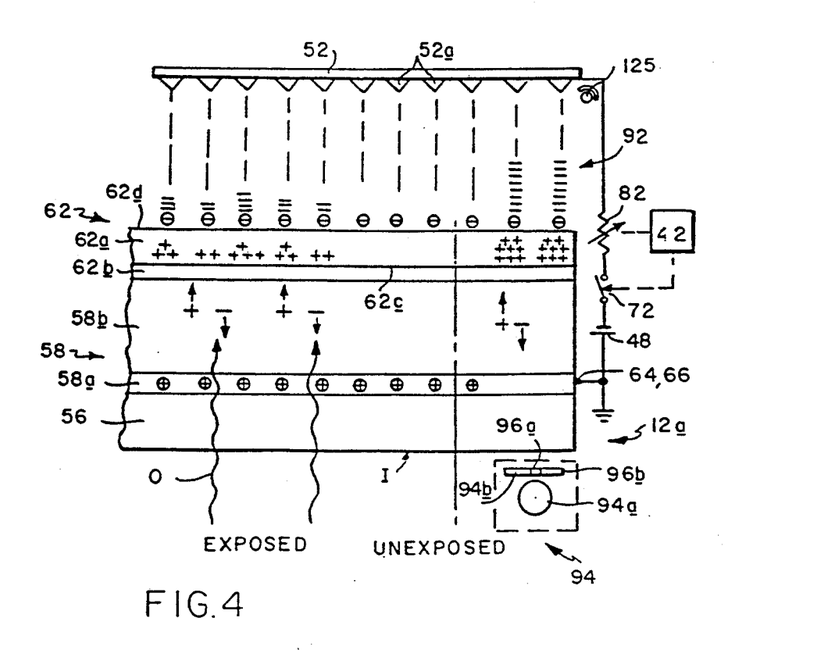
FIG. 4 is a diagrammatic view illustrating the exposure of the recording member in the FIG. 1 system.
Figure 5:
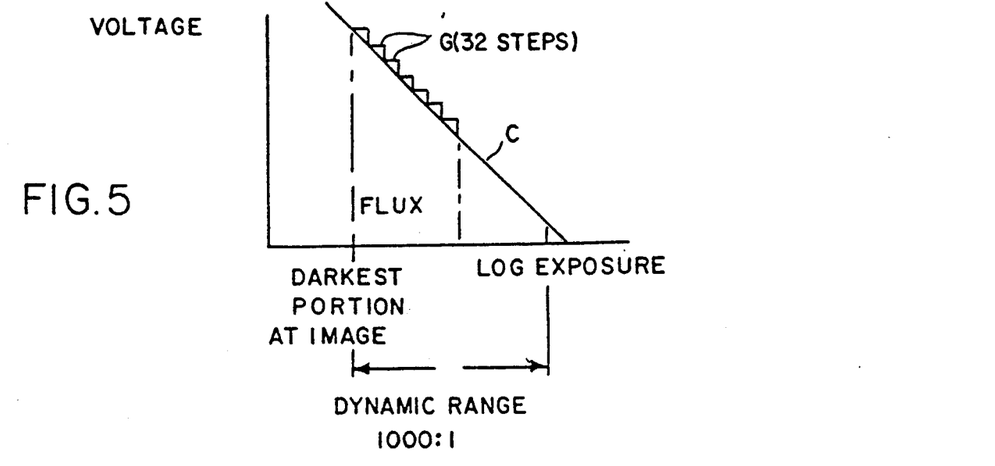
FIG. 5 is a graph illustrating the mode of controlling exposure of that member.

Refer now to FIG. 4 which shows the electrical environment of tape frame 12a during exposure and to FIG. 5 which depicts a typical characteristic curve C for the tape frame being exposed. Effectively, controller 42 controls a variable resister 82 connected in series with electron source 52, a 5-100 volt tap of power supply 48, switch 72, and tape frame 12a at zone 58a thereof so that the darkest part of the light image being projected onto frame 12a receives a selected minimum exposure, i.e. at least $10^9$ photons/cm$^2$, corresponding to $10^{-3}$ ergs/cm$^2$. In a typical case, the charging current in the FIG. 4 circuit is under one ampere and persists for 1 microsecond to 1 second (or more), depending upon the amount of light incident on the tape. Each incident photon produces one electron-hole pair in modulator 58 as shown in FIG. 4. In the portions of modulator 58 where the light image is darkest, the incident light emanating from a faint image typically produce in the order of $30 \times 10^8$ electrons/cm$^2$. For the brightest parts of the modulator, there may be in the order of $30 \times 10^{11}$ photogenerated electrons/cm$^2$. Thus, the charges stored at different locations on tape layer 62 may vary from, say, 20 electrons/resolution element to 20,000 electrons/resolution element, permitting the retrieval of far more that the desired 32 different gray level steps G in the image being recorded on frame 12a, as shown in FIG. 5.

The electric field across the tape causes the photogenerated electrons to move toward conductive zone 58a from where they are conducted away to ground via contact 66. The photogenerated positive carriers or holes move toward tape storage layer 62. Under the influence of the strong superimposed external bias field extending between electrode zone 58a and the virtual electrode formed by electron deposition on surface 62d of layer 62 and of the additional internal fields formed between negative electronic charges on that surface and the innate positive potential of the holes, these positive charges tunnel through the interfacial zone 62b and are trapped in the undersurface 62c of the dielectric zone 62a to a depth in the order of 100 Angstroms in numbers that are in direct proportion to the image brightness in the different parts of the image area I of the frame 12a. These positive charges are balanced by equal numbers of electrons from source 52 that repose on the surface 62d of layer 62 as shown in FIG. 4. Although the charge domains or numbers of electrons stored at adjacent resolution elements on tape surface 62d may vary to establish the contrast or gray levels in the stored electronic images, the potential verses electrical ground, i.e. zone 58a, is equalized throughout the frame. Thus, during exposure, controller 42 charges frame 12a to a voltage and for a time so as to operate on the optimum segment of the tape's characteristic curve C shown in FIG. 5, under the prevailing lighting conditions.

Thus during the exposure process, electron source 52, under the control of controller 42, disperses a specific amount of negative charges to tape surface 62d during the exposure duration to equal the maximum number of photogenerated charges which have tunneled through tape zone 62b, thereby establishing a charge equilibrium in the storage zone 62a. Accordingly, a perfectly exposed, electronic equivalent image, corresponding to the photonic image projected onto focal plane P, is acquired by tape frame 12a and stored in its storage layer 62. As shown in FIG. 4, the electronic images are present on layer 62 as a topographical distribution of different-charge coulombic domains over the image area I of the tape frame 12a. This distribution is composed of two parts, namely the charges which were deposited on layer 62 at the beginning of the exposure step to establish the initial internal bias field between the surface 62d of layer 62 and the electrode zone 58a, plus the photogenerated equivalent charges created by exposure of the tape frame.

Thus, the number of electrons at each point on the surface 62d equal the number deposited initially (circled in FIG. 4) plus a number of electrons corresponding to the number of photogenerated positive charge carriers that tunneled through zone 62b during the exposure step (uncircled in FIG. 4). In the normal mode of operation, the initial charge (circled in FIG. 4) remains on tape frame 12a after the exposure step is completed, i.e. after electron source 52 is shut off and switch 72 is opened. On the imaged frame 12a, then, the charges on zone 62a are spacially varied by the number of photogenerated carriers which became superimposed on the blanket of evenly distributed carriers present in thermal equilibrium initially. Thus, for a typical photographic scene, the numbers of opposed positive and negative charges are substantially equal within said resolution element, but different with respect to other resolution elements.

After the exposure step, when source 52 is turned off and switch 72 is opened thereby removing the negative bias that was set to control electron cloud current density and duration, the positive charges which tunneled through tape zone 62b remain pinned in place in zone 62a. It should be noted that any free thermally generated or even photogenerated positive carriers now have insufficient energy to tunnel through the zone 62b barrier and upset the stored charge count at the underside 62c of zone 62a.

In special cases, such as low light level exposure, it may be desirable to eliminate the electrical bias field applied to the tape frame 12a through the removal of the charges deposited initially on the frame. This passivation step, if used, involves the operation of the electron source 52 in circuit with the tape so that each primary electron from source 52 results in the emission of more than one secondary electron from the surface 62d of tape layer 62. This emission gradually turns that surface electrically neutral or positive with respect to electrode layer 58a. Referring now to FIGS. 3 and 4, the bias removal of frame 12a is initiated automatically by controller 42 immediately following the exposure step while frame 12a is still at the write station 26 in the darkness of compartment 10. Controller 42 closes a switch 86 momentarily (e.g. for 1/10 microsecond) so that a negative voltage in the order of 500V from power supply 48 is applied to the strip 64 and electrode layer 58a of that frame by way of contact 66 on source 52. Simultaneously, the controller turns on electron source 52, still overlying that frame, which directs a flood of energetic electrons to the surface 62d of storage zone 62a causing the emission of secondary electrons from that surface, in numbers that exceed the number of arriving primary electrons from source 52. Once the electrons are removed from the darkest parts of the image areas (i.e., those electrons deposited initially at the beginning of the exposure step, circled in FIG. 4), only the uncircled electrons remain which counterbalance the positive charges pinned to the underside of zone 62a. Thus, only the charges corresponding to the image will remain on the frame. In response to incident light varying from $6 \times 10^8$ photons/cm$^2$ to $6 \times 10^{11}$ photons/cm$^2$, a typical electronic image might vary from 20 electrons/pixel to 20,000 electrons/pixel, corresponding to a field strength of 70 V/cm to $70 \times 10^3$ V/cm inside the storage zone 62a. The removal of the blanket surface charge from surface 62d over the entire area leaves the stored image completely free of this blanket bias charge. The surface charge in the exposed portions of the frame now reflects only the image information.

Instead of using source 52 for the passivation step just described, in some applications, it may be preferable to position a separate electron source (not shown) for that purpose in housing 10 between the write station and the read station. Then, when a tape frame is moved to the latter station, the emitter needles of that source will rake across the undersurface 62d of the tape to remove the bias charge therefrom as just described.

Still another way to remove that bias charge is to provide an electrically grounded conductive roller 87 between the two stations, as shown in FIG. 1, so that the roller touches the tape surface 62d as the tape is advanced to station 28. It should be noted that those electrons bound to underlying positive charges in zone 62a and representing the stored image remain unaffected as the roller 87 rolls over tape frame 12a.

The magnitude of the dark current in light modulator layer 58 during exposure and bias removal is temperature dependent and relatively small in comparison to the charges created during exposure. However, if temperature compensation is desired, a temperature sensor (not shown) may be mounted in housing 10 and coupled to controller 42 so that the duration of the exposure and bias removal steps may be varied to compensate for those temperature changes.

Referring now to FIGS. 2 and 3, simultaneous with the recording of the image on each tape frame 12a as just described, an electronic fiducial mark 92 is recorded in an edge margin of that frame area outside the image area I thereof as shown in FIG. 2. As will be seen later, these marks 92, recorded at the same times as the images, enable the system, prior to each read-out operation, to set the initial or home position and skew of the electron beam that scans the tape during a read operation at station 28 to compensate for any slight mispositioning of each tape frame 12a at its position at the scanning plane R when an image is read from the frame, with respect to its position at focal plane P when that same image was recorded on that frame.

My system records these marks 92 on the tape by means of a light unit 94 located in platen 32 at the upper righthand corner thereof at focal plane P. As shown in FIG. 2, unit 94 comprises an elongated light source 94a such as a LED or a laser diode extending parallel to tape 12 and which preferrable emits green (e.g. 500 nm) light. The other component of unit 94 is an opaque mask 94b positioned at platen surface 32a to be in intimate contact with frame 12a at focal plane P. The mask has a precise narrow slit 96a extending parallel to the tape (i.e. X axis) with a (Y axis) cross-slit 96b positioned adjacent to the foward edge of platen 32. Each time an optical image is recorded on the image area I of a tape frame 12a, controller 42 energizes light source 94a so that the marginal area of tape frame 12a opposite slits 96a and 96b receives a saturating dose of light. Resultantly, an easily detectable electronic fiducial mark 92, having cross arms 92a and 92b, is recorded on tape 12. As shown in FIG. 4, the fiducial mark actually consists of a large number of negative charges deposited on surface 62d of frame 12a outside its image area I (with an equal number of underlying positive charges in tape zone 62a).

After an electronic image is recorded on a tape frame 12a as just described, that image can be read out or retrieved from the tape by positioning that tape frame in the scanning plane R at read station 28 by appropriately driving spool motors 18 and 22 via controller 42. As mentioned previously, controller 42 counts pulses from tape position detector 46 so that it "knows" when a particular frame along the tape, say frame number three, is properly positioned at plane R for read-out.

As seen in FIG. 1, located opposite to the read station 28 of my system is an electron gun shown generally at 102. The gun includes an electron emitter or cathode 106 that produces a stream of electrons e. An accelerating anode 108 accelerates the electrons toward the surface 62d of the frame 12a at scanning plane R so that the beam which impinges on the tape is finely focused to a diameter that is slightly less than the width of the filter stripes 76 (FIG. 2). Gun 102 also includes the usual horizontal and vertical deflection plates 110a and 110b. The fields developed between these plates are controlled by a beam deflection control circuit 112 in housing 10 so that the electron beam sweeps out a raster on the surface 62d of the frame 12a at read plane R. As mentioned previously with respect to FIG. 2, the lines L of the raster should correspond to the lines on frame area 12a that were recorded through the array of filter strips 76. When lines L are sinusoidal or wavy to avoid the "picket fence" effect described above, circuit 112 is arranged to drive the beam along a corresponding wavy path as it sweeps across the frame surface.

As shown in FIG. 2 and as will be described in more detail presently, the impingement of the beam electrons e on the tape frame 12a causes secondary electrons e' to be emitted from the tape whose numerical distribution by pixels or resolution elements in the scan represents the electronic image stored on the frame. The secondary electrons e' are collected by an electron collector 114 encircling electron emitter 106 and a picture signal is developed which is the electrical analog of the stored image. That signal is applied to a read-out circuit 116 contained in housing 10 where it is amplified, digitized and otherwise conditioned before being applied to an output terminal 116a which may be coupled to a video display or printer (not shown) where the retrieved image can be viewed or reproduced.

When system 10 is to read the image on the frame 12a present at scanning plane R, controller 42 closes a switch 118 which, as seen in FIG. 1 to 3, connects a wiper contact 122, or equivalent, thereby engaging tape strip 64 at station 28, and thus tape zone 58a, in a high voltage (i.e. 300V) DC circuit with emitter 106 (maintained at −2KV). Whereupon, the emitter emits a smaller diameter (typically 2 micrometers) electron beam which impinges the selected tape frame 12a at scanning plane R. Since tape 12 is infrared sensitive, the electron beam source 106 must be a cold field emission device rather than a thermionic device thereby avoiding exposing the tape to infrared radiation while it is being read. Cold cathode emission sources of this type have, to our knowledge, not been used previously in such a scanner application; they can be operated with very little power (about 1 nanoampere).

Where the beam e impinges the frame 12a, secondary electrons e' are emitted from tape zone 62a at that point. As noted previously and as shown in FIG. 4, the charges on zone 62a consist of the photogenerated positive charges pinned to the underside of zone 62a and an equal number of negative signal charges or electrons resident on zone surface 62d (uncircled in FIG. 4) and, if not removed as described above, bias electrons (circled in FIG. 4) present as a result of the initial bias field applied to the tape during the exposure process described above. The surface electrons on zone 62a are bound in equal numbers to positive charges, with excess electrons resulting from the initial bias field being less strongly bound to the surface so that they can be removed easily via a short circuit with the tape electrode layer. The underlying positive charge carriers at the underside of zone 62a remain pinned at their locations, as do their corresponding negative charges on surface 62d.

Figure 6:
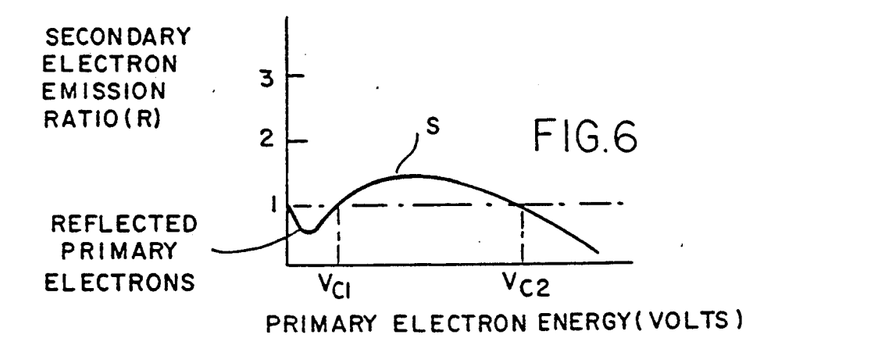
FIG. 6 is a graph which helps to explain the operation of the FIG. 1 system during read-out.

The waveform S in FIG. 6 shows the variation of the secondary electron emission ratio (R) with primary electron energy, i.e. no. of primary electrons/no. of secondary electrons versus primary beam voltage when the beam from gun 102 strikes tape 12. The ratio R is unity at two locations on waveform S, namely at a first voltage $V_{c1}$ and a second voltage. At these two crossover potentials, the number of secondary electrons ejected from tape zone 62a at each pixel equals the number of primary electrons e in the beam from source 106 that impinge that pixel. The present system normally operates between the first and the second crossover point $V_{c2}$ and near the latter so that the primary electrons have sufficient energy to partially penetrate the layer 62, but not deep enough to reach the positive charges pinned to the underside of that zone. Consequently, the electron beam which scans the tape frame in order to read the image thereon does not affect the image-representing positive charge pattern at the underside of frame 62a so that the integrity of the negative charge domains on surfae 62d is maintained.

The impingement of primary electrons e on tape frame 12a results in the emission of secondary electrons from within the bulk just beneath the surface 62d of layer 62, with said secondary electrons being created through electron collisions within the bulk of the layer 62. These newly generated negative charges form the electron flux e' whose intensity is determined by both the coefficient of secondary emission (ratio) and the influence of the internal fields which make up the image-wise charge domains, with the latter being able to restrict the number of secondary electrons which are emitted. All of the electrons in the secondary electron flux e, are collected by collector 114 which thereupon produces an output signal reflecting the electron count. It is apparent, therefore, that the number of electrons, i.e. flux e', detected at each picture element point in the primary beam scan (and hence the amplified collector output signal) will depend upon the field intensity present at said pixel which modulates the number of actually emitted secondary electrons. More particularly, where the number of stored electronic charges on zone 62a is smaller, corresponding to a point outside image area I or to relatively dark or unexposed points inside area I, the number of electrons in the secondary flux e' will be larger. The maximum return flux occurs in the areas where no fields are present. There will likewise be a decrease in the number of secondary flux electrons from a point on the swept frame area where the number of stored charges on zone 62a is larger. At the fiducial mark 92, the secondary flux is mimimal because the internal field is at a maximum. Thus by subtracting from the electron count detected by collector 114 the electron contribution due to secondary electron emission and blanket charge electrons (if present), the flux electron count produces an output signal from the collector/amplifier which represents the electronic charge distribution on tape frame 12a which, in turn, corresponds exactly to the optical image recorded on that frame at write station 26.

Read-out by secondary electron emission detection in this fashion allows the integration of the collector with a channeltron or dynode type amplifier. These are known electronic devices which require low power, yet produce a current output which is as much as 1,000,000 times stronger than the input represented by return flux e', while introducing mimimal electrical noise. Resultantly, for each scan of a tape frame 12a at read station 28, my system will provide a highly amplified signal representing first the electronic fiducial mark 92 recorded in the margin of that frame to zero-set the scan beam electronics and then the electronic image stored in that tape frame's image area I. Thus the read-out process carried out by the system involving the field-modulated count of secondary electrons emitted from tape 12 is totally different from the prior scanning methods described at the outset which detect a capacitively modulated field-unrelated ground current signal from a recording medium as the reading beam establishes charge equilibrium and destroys the signal. Here, by detecting and simply counting individual electrons in a secondary flux e' modulated by the topographic field intensity distribution on tape surface 62d rather than by detecting current flow through the frame, the system can take advantage of the highly sensitive, defect-free nature of the tape 12 to produce a picture signal which contains minimal noise and has extremely high resolution combined with an exceptional greyscale. Furthermore, it can accomplish this at a lower read-out or scanning voltage than those prior systems, thereby conserving power. In addition, the read-out is non-destructive with regard to the field domains in layer 62 and, for this reason alone, is superior to other techniques.

The beam from gun 102 typically scans 16,000,000 R,G,B resolution elements in nine seconds or 5,300,000 monochrome resolution elements in three seconds, corresponding to a dwell time at each raster resolution element or pixel on frame 12a of about 0.6 microseconds. A typical FIG. 1
system which is designed to detect 20 to 20,000 electrons during the dwell time at each resolution element (i.e. 1:1000 dynamic range) would require a minimum beam current in the beam from gun 102 of $5 \times 10^{-9}$ amp or 5 nanoamperes. Using a collector such as the first stage of a low-noise electron multiplier (channeltron/dynode), the signal current ($i_s$), noise current ($i_n$) and output signal current ($i_{sn}$) may be determined. Thus, for a low light level in which the minimum light signal is represented by 20 electrons per pixel and the maximum by 400 charges per pixel, the beam current must be equal to or greater than the maximum number of charges per pixel; with this constraint, the noise associated with the flux of 400 primary electrons in the selected scan time of $0.6 \times 10^{-6}$ sec. per pixel is as follows:

$$\text{scan time per pixel} = 0.6 \times 10^{-6} \text{ sec.}$$

$$\text{Maximum beam current } (i_b) = \frac{400 \times 1.6 \times 10^{-19}}{0.6 \times 10^{-6}}$$

$$= 10^{-10} \text{ amp./pixel}$$

$$\text{After amplification, the current } i_{sn} = 10^{-10} \times 10^6$$

$$= 10^{-4} \text{ amp./pixel}$$

The noise current associated with the beam current is $$i_n = (2ei_b f)^{\frac{1}{2}}$$

where
$$e = 1.6 \times 10^{-19} \text{ coul.}$$
$$f = 1/(2 \times 0.6 \times 10^{-6}) \text{ sec.}$$
$$= 5.4 \times 10^{-12} \text{ amp.}$$

Therefore, the signal-to-noise ratio $$i_b/i_n = (400)^{\frac{1}{2}} = \frac{10.7 \times 10^{-11}}{5.4 \times 10^{-12}} = 20:1$$

If that ratio were reduced to a minimum usable level of 5:1, the corresponding number X of electrons would be $$5/1 = Xe/\text{scan time} = (X)^{\frac{1}{2}}$$

$$(X)^{\frac{1}{2}} e/\text{scan time}$$

$$X = 25$$

The dynamic range is therefore $400/25 = 16:1$ of target electrons.

The output signal current from the target (before being applied to the electron multiplier) ranges from a minimum of $$i_{sn} = \frac{25 \text{ elec.}}{\text{pixel}} \times \frac{1.6 \times 10^{-19} \text{ coul.}}{\text{electron}} \times \frac{1}{0.6 \times 10^{-6}} \text{ sec./pixel}$$

$$i_{sn} = 6.67 \times 10^{-12} \text{ amp. to a maximum of}$$

$$i_{sn} = 400 \times \frac{1.6 \times 10^{-19}}{0.6 \times 10^{-6}}$$

$$= 10.7 \times 10^{-11} \text{ amp.}$$

In a preferred embodiment of my system, means are provided to vary or select the primary beam current commensurate with the maximum exposure which an image frame saw in the field of view. For this purpose, the particular frame (as is each frame on the tape) is marked with an electronic code whose value indicates the amount of light which the exposure meter reads prior to the exposure for said frame, as the meter sends the exposure control signal to the electron cloud generator 52.

Thus, for example, if the exposure equalled $10^{-1}$ erg/cm², then the light flux per pixel produced 20,000 electron-hole pairs, which means that the primary beam should be set at 20,000 electrons minimum during the pixel scan time. If the exposure were $10^{-3}$ erg/cm², then the beam would be set to 20 electrons/pixel during the scan time in order to detect the full equivalent signal which the 20 electron-hole pairs produced during the exposure.

For the maximum detectable exposure,
Noise current = $3.77 \times 10^{-11}$ amp.
Signal-to-noise ratio = 141:1.

For a signal-to-noise ratio of 5:1, the corresponding number of electrons = 25.

Dynamic range equals approximately 800:1 of target electrons.

Output signal current $i_{sn} = 6.67 \times 10^{-12}$ amp. (min.) to $5.33 \times 10^{-9}$ amp. (max.).

Figure 8:
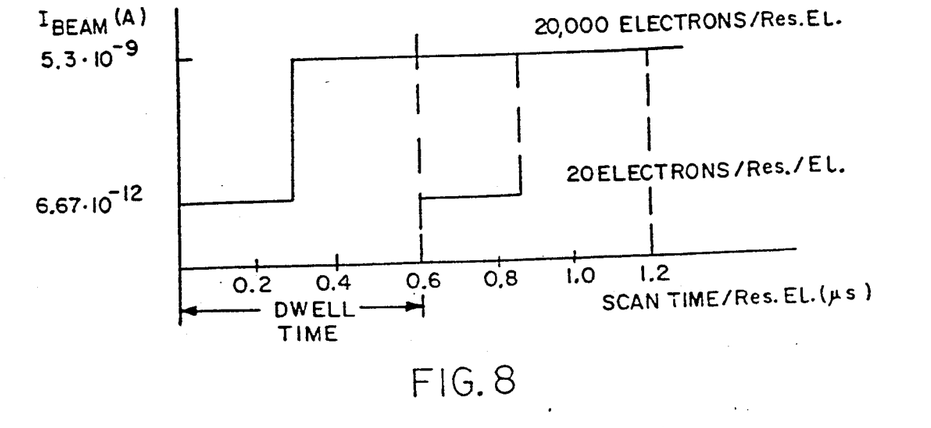
FIG. 8 is a graph showing the variation in electron beam current during a read-out operation by my system.

It will be apparent that the system could also be arranged to have several current steps during the dwell time of the beam in each pixel or resolution element of the scan raster. For example, the beam current might be stepped up to $10^{-4}$ amp. to provide another dynamic range level of 160,000 to $256 \times 10^8$ electrons. Normally, however, this enormous range is not required because a typical scene contains only about 100:1 contrast between the light and dark areas thereof.

In some applications, the beam scan control circuit 112 can be arranged to control the beam from gun 102 so that it scans two different rasters. A rough scan, say every other or every third line L, may be executed (for each color) to provide picture signals suitable for previewing on a video display to which the present system may be connected to see if the correct image is being retrieved. Then, if the image is correct, a regular scan at the final resolution may be performed to reproduce a hard copy of that image in a printer connected to the system at terminal 116a.

Figure 7:
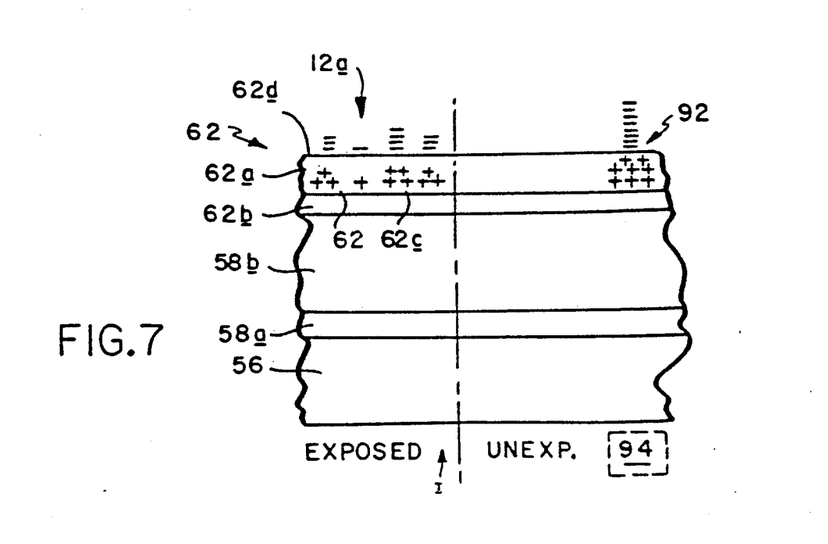
FIG. 7 is a view similar to FIG. 4 further illustrating the operation of my system.

Also, if the electronic images were recorded on tape 12 in the presence of an electrical bias field caused by the deposition of a uniform blanket layer of electrons on the tape surface 62d, these bias electrons (circled in FIG. 4), unless removed after the exposure step as described above, are still present on tape surface 62d at the recording station 28. In my system as described thus far, the electron source 106 is preferably operated between the first and second crossover points shown in FIG. 6, so that, as noted above, the number of electrons in the secondary electron flux e' from points in unimaged areas of the tape equals the number of ejected secondary electrons minus the number of image-wise electrons which were prevented from leaving the material due to the internal fields. As noted above, during the scanning process, there are enough secondary electrons ejected from the tape to drive each point on the tape surface sufficiently electropositive to offset the negative bias charge present at that location on the tape. In this event, as shown in FIG. 7, there will be left behind only the negative signal charges at the surface 62d which are more strongly bound to the underlying image-representing positive charges pinned at the underside of zone 62a.

When my system scans a frame 12a during read-out, unlike prior systems described at the outset, it does not destroy the electronic image stored on that frame. On the contrary, the system refreshes that image which can be read over and over again. This is because during scanning, which takes place in the darkness of housing 10, there are no photo-induced electron-hole pairs produced in the tape's modulator 58. Nor is there any buildup of charge on the tape's storage layer 62 because, as noted above, the positions of the positive charge carriers pinned at the underside of zone 62a remain undisturbed by the beam, while the negative image-wise charges at surface 62d are replenished. This may be accomplished by exposing the tape frame to electrons from source 52 prior to readout or by operating electron gun 102 at a lower energy level and scanning the frame prior to readout so that electrons impinge the tape without causing secondary electron emission therefrom. Thus a charge balance is maintained across layer 62 at each point thereon, as depicted in FIG. 7. As a consequence, the field strengths of the charge domains distributed on layer 62 of each frame 12a are maintained, allowing theoretically infinitely repeated read-outs of that frame.

In fact, due to the high degree of perfection of tape 12, the electronic images recorded on tape 12 will remain there for several years unless they are erased intentionally. In my system, such erasure is accomplished simply by positioning the frame 12a containing the image to be erased at write station 26 (or elsewhere in housing 10) and energizing a U.V. lamp 125 mounted to source 52. The short wavelength radiation from that lamp renders the tape layer 62 conductive thereby removing the image-representing charge pattern from that frame.

As mentioned previously, the strong electronic fiducial mark 92 recorded on each frame 12a is used to initialize the beam scan prior to reading the image stored on that frame. More particularly, at the outset of each read-out operation, controller 42 causes beam control circuit 112 to execute a search routine in order to "find" fiducial mark 92. According to this routine, circuit 112 deflects the primary beam e so that it sweeps out a spiral or circular motion (or other suitable geometric sweep pattern) while advancing along the upper margin of the tape where the fiducial mark 92 is located, i.e. the region between the edge of frame 12a and the edge of image area I. When the beam in its rotary motion passes through an arm 92a or 92b of the fiducial mark, there results a sharply reduced burst of electrons in return flux e'. The few electrons in the signal are caused by the retardation of secondary electron emission due to the strong electric field in the fiducial mark area. These few fiducial mark electrons (voids) are collected by collector 114 and detected as such by threshold detection in read-out circuit 116 which thereupon issues a control signal to control circuit 112. In response to that signal, circuit 112 causes the primary beam circular sweep to cease translating along the tape margin and to scan in the nearby area until the collector detects four electron voids signifying that beam e is sweeping across the two fiducial mark cross-arms 92a and 92b. The presence of these four signals at the output of collector 114 indicates that beam e is more or less centered on the fiducial mark 92. These signals are applied to circuit 112 to cause that circuit to shift the beam slightly in one direction or another until the signals are equally spaced apart in time signifying that the axis of beam e is aligned with the fiducial mark axis and that the X and Y deflection axes of the beam are parallel to the fiducial mark arms 92a and 92b respectively.

If desired, the cicuit 112 initialization routine can be arranged to cause beam e to execute several circular scans of the fidicual mark 92 to provide redundancy and thus assure the accuracy of the "home" position setting of the beam. At the end of the initialization routine, the now-ascertained position of the fiducial mark 92 on the X and Y scan coordinates is stored in a memory in circuit 112 and the actual read-out scan is started at a fixed offset from that point, e.g. at the corner of image area I.

The significance of initializing the electron beam prior to reading images from the tape relates to the fact that the very fine signal pattern stored on each frame 12a was recorded contemporaneously with the electronic fiducial mark 92 on that frame, thus linking the 2.5 micron-wide color sripes 76 to the scan coordinates and deflection electronics in cicuit 112 which must guide the 2.0 micron diameter beam e during read-out. By recording the fiducial mark 92 and the image on frame 12a simultaneously while the tape, and hence that frame, was stationary and frozen geometrically at exposure station 26 and prior to any, even very minute, movement of the tape away from the filter stripes 76 assures that the beam e will sweep along raster lines L that correspond exactly to the lines on frame 12a that were exposed through the filter stripes. Bearing in mind that the lines of color information on frame 12a are in the form of electrical signals only (i.e. charges), they carry no identification of their optical coloration. Accordingly, the providing of fiducial mark 92 and the initializing routine described above assures that during a read operation, the beam e is following or sweeping out the correct raster path on frame 12a even though that frame might have been shifted or skewed to some extent so as to place the equivalent color stripe information in a shifted position with respect to the electron source 106.

After the beam has been "zero-set" ready for image scanning, it first will seek out an exposure code area in which the exposure meter left a recorded exposure value which now can be used to set the beam current commensurate with the electron charge density values which represent the image over the frame as described previously.

Figure 9:
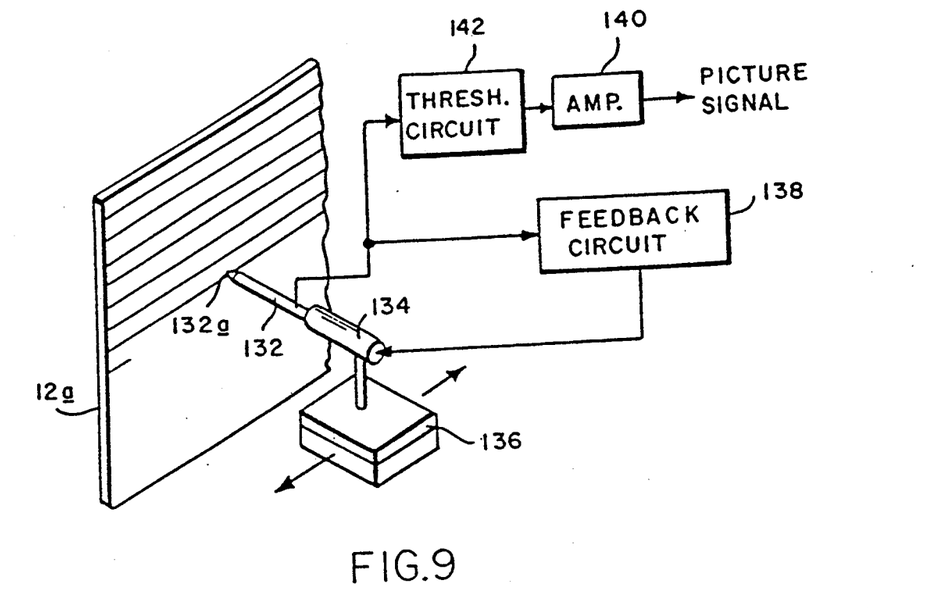
FIG. 9 is a diagrammatic view showing another read-out system embodiment.
Figure 10:
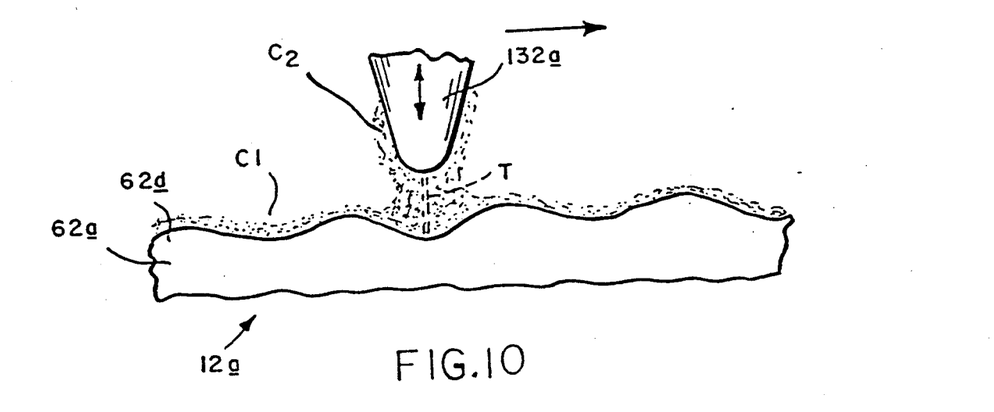
FIG. 10 is a similar view on a much larger scale showing the operation of the FIG. 9 system.

Referring now to FIGS. 9 and 10, instead of reading the electronic image stored on tape frame 12a by electron beam scanning, the tape can also be read by detecting so-called "tunnel electrons" emissions. For this purpose one preferably uses a linear array of very sharp tungsten sensing needles 132 which move across the tape surface in rake-like fashion as shown in FIG. 9. This read-out technique uses the tunnelling electron phenomenon described, for example, in the publication *Scientific American,* August 1985 Edition, pages 50 to 56. As disclosed there, due to their wave-like nature, electrons on a surface leak out and form a cloud above that surface. Therefore, as best seen in FIG. 10, when a needle tip 132a is spaced sufficiently close to the charged tape surface 62d, electron clouds C1 and C2 present above those surfaces gently touch. When a voltage is applied between the tip 132a and the tape's electrode layer 58a, so-called tunnel electrons flow from the tape surface to the needle tip along a narrow channel T through these overlapping electron clouds, giving rise to a tunnelling current $i_t$.

Since the density of an electron cloud $C_1$ or $C_2$ falls expotentially with distance, the tunnelling current $i_t$ is very sensitive to the distance between each needle tip 132a and the tape surface 62d. A change in that distance by as little as one atomic diameter causes a change in tunnelling current by a factor of as much as 1000. In the FIG. 9 system, each needle 132 in the linear array is held by a suitable needle positioner 134 and swept in a raster across tape surface 62d by an appropriate sweep mechanism 136 such as the one described in the above article. Each needle, in effect, picks off electrons from the tape surface at each point in the scan giving rise to a tunnelling current $i_t$ in needle 132. This current signal is applied to a feedback circuit 138 which controls the needle positioner to maintain the needle tip 132a at a constant height above the surface 62d atoms. In this way, the scanning needle tip 132a follows the contours of surface 62d as shown in FIG. 10. When that distance is kept constant, the tunnelling current $i_t$ at each point or resolution element in the needle scan depends upon the electronic structure of the tape surface 62d and the number of electrons present on that surface at that location. That current signal is also applied to an amplifier 140 by way of a threshold circuit 142 which subtracts the signal contribution due to tape surface structure (i.e. the signal present in an unimaged area of the tape). Resultantly, the amplifier output is a picture signal which is an exact representation of the electronic signal pattern stored on the tape frame 12a along the line scanned by the needle. That signal will, of course, include the initial bias charge unless that charge is removed following exposure as described above.

It will thus be seen that the objects set forth above, among those made apparent from the preceding description, are efficiently attained. Also, certain changes may be made in the method described above and in the construction shown herein without departing from the scope of the invention. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed is:

1. Apparatus for reading electronic data from a movable electronic signal-sensing recording medium, said apparatus comprising
   A. an envelope;
   B. a plural layer optoelectronic signal-sensing recording medium including a light modulating layer and movably positioned in said envelope, said medium carrying an electronic signal pattern representing an image projected onto the light modulating layer;
   C. means in said envelope for positioning said medium at a read position in said envelope, and
   D readout means at said read station for detecting the spatial distribution of the electrical charges in said signal pattern.

2. The apparatus defined in claim 1 wherein said readout means comprise
   A. one or more electrically conductive needles having relatively sharp tips;
   B. means for positioning said one or more needles so that each needle tip is spaced a very small distance from a surface of the medium so that an electron cloud is present between the opposing surfaces of each needle tip and the medium;
   C. means for establishing a potential difference between each needle and the medium so that electrons comprising the signal pattern on the medium tunnel through said cloud to each needle tip with the number of electrons emitted to each tip relating directly to the presence or absence of said signal pattern and the magnitude of said pattern opposite each tip.

3. The apparatus defined in claim 2 wherein said readout means comprise:
   A. means for maintaining each needle tip at a substantially constant distance from said medium surface, and
   B. means for detecting the tunneling current between each needle tip and said medium surface.

4. The apparatus defined in claim 3 and further including means for scanning said one or more needles relative to said medium surface.

5. The apparatus defined in claim 1 wherein said readout means comprise
   A. an electron beam source positioned to direct a finely focused primary electron beam to said medium when said medium is positioned at the read position, and
   B. deflection means for deflecting the beam from said source so that the beam scans a raster on the medium, said beam spending a selected dwell time at each resolution element of the scan so that said primary beam causes secondary electron emission from each resolution element.

* * * * *